Jan. 14, 1964   H. H. LEACH   3,118,119
RADIO FREQUENCY COAXIAL REDUCING SECTION HAVING SHORT
TAPERS, OFFSET FROM EACH OTHER, IN INNER
AND OUTER CONDUCTORS
Filed July 27, 1961

INVENTOR.
HAROLD H. LEACH
BY
Ezekiel Wolf, Wolf & Greenfield
ATTORNEYS

United States Patent Office 3,118,119
Patented Jan. 14, 1964

3,118,119
RADIO FREQUENCY COAXIAL REDUCING SECTION HAVING SHORT TAPERS, OFFSET FROM EACH OTHER, IN INNER AND OUTER CONDUCTORS
Harold H. Leach, Winchester, Mass., assignor to Andrew Alford, Boston, Mass.
Filed July 27, 1961, Ser. No. 127,258
4 Claims. (Cl. 333—33)

The present invention relates in general to radio frequency components and more particularly concerns a novel device for inter-coupling two coaxial transmission lines of different diameters without itself being a source of reflections over an exceptionally wide range of frequencies. Not only is the electrical performance of the invention outstanding, but the device is far less costly and far more compact than a comparable prior art device.

The invention will be better understood and appreciated by considering its use in connection with a precision slotted line for making precise high frequency measurements. Basically, a slotted line comprises a section of coaxial transmission line having a longitudinal slot in its outer conductor, and a carriage which travels the length of this slot. A probe rides in the carriage and projects through the slot to sample the electric field near the inner surface of the outer conductor.

Ideally, a slotted line should be a continuation of the external transmission line itself, differing from the transmission line only in that means are provided for sampling the voltage between the inner and outer conductors without disturbing the propagation of the wave along the line. The transition discontinuity between the slotted section and the concentric line is least when conductors of the slotted line are substantially cylindrical (except for a narrow slot); that is, similar to the concentric transmission line itself.

An accurate slotted line is a basic measuring instrument having a number of uses. The primary use of a slotted line is in the measurement of standing waves along transmission lines and in the determination of R-F impedances. Other uses include the measurement of the relative phase of two voltages, and the measurement of frequency or frequencies.

When a slotted line is connected to a perfectly terminated coaxial transmission line having the same inner and outer conductor diameters as the slotted line, the signal picked up by the probe is substantially constant except for slight variations which may be caused by the signal source, the slotted line and/or by the detecting device. If the coaxial transmission line is not perfectly terminated, the detector output will indicate a sequence of alternating maxima and minima as it slides along the length of the slotted line. The distance between successive minima corresponds to the wavelength of energy of a single frequency in the line. The ratio of maximum amplitude to minimum amplitude is a measure of the VSWR in the slotted line.

To insure accurate measurements, the dimensions of the slotted line must be controlled to within precise tolerances. Since the characteristic impedance of a coaxial transmission line is proportional to the logarithm of the ratio of the inside diameter of the outer conductor to the outside diameter of the inner conductor, a given absolute dimensional tolerance capable of being maintained will produce less of a deviation in characteristic impedance if the dimensions of the slotted line diameters are relatively large. This choice of relatively large diameters also helps to minimize the effect of a slot of a given absolute width. Accordingly, a typical slotted line with a characteristic impedance of 50 ohms is formed with an inside diameter of 1 inch. But most 50 ohm flexible transmission lines, such as RG58U/A coaxial cable, is much smaller.

The problem of intercoupling two coaxial transmission lines, which differ in diameter but have the same characteristic impedance, without appreciably increasing the VSWR has been satisfactorily solved for wide band operation by using a tapered reducer having both inner and outer conductors gradually tapered from diameters corresponding to those of the smaller line to diameters corresponding to those of the larger line. While the electrical performance of these tapered reducers is excellent, they are costly to fabricate and are relatively long. Although a step reducer incorporating a stepwise change in the diameter of both inner and outer conductors may be somewhat shorter than a tapered reducer, the electrical performance of these step reducers is limited to a relatively small range of frequencies.

Accordingly it is an important object of the present invention to provide a reducer for intercoupling two coaxial transmission lines which differ in diameter but have the same characteristic impedance without introducing an appreciable increase in VSWR over an exceptionally wide range of frequencies while maintaining size and cost of fabrication relatively small.

According to the invention, the novel component includes a coaxial section having a beveled inner conductor, and an outer conductor with a beveled inside surface. The beveled inside surface and beveled inner conductor at least partially overlap and the length of each beveled section is preferably less than a wavelength at the highest frequency transmitted by the component without appreciably increasing the VSWR.

Other features, objects and advantages of the invention will become apparent from the following specification when read in connection with the accompanying drawing in which.

Figure 1:
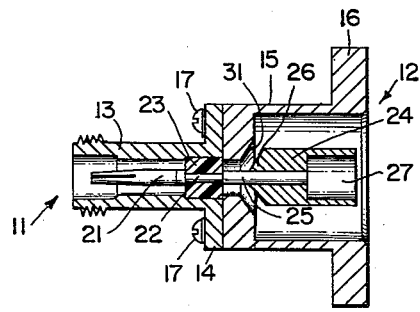
FIG. 1 is a longitudinal sectional view through a representative embodiment of the invention for intercoupling coaxial transmission lines of the same characteristic impedance but different diameters.

With reference now to the drawing and more particularly FIG. 1 thereof, there is illustrated a longitudinal sectional view through a component according to the invention. Since the component is substantially circularly symmetrical, the illustration shown in FIG. 1 best illustrates an embodiment of the best mode now contemplated for practicing the invention.

A small diameter coaxial transmission line connected at end 11 may be intercoupled with a coaxial transmission line of the same characteristic impedance but larger diameter at end 12 with the component shown in FIG. 1 negligibly increasing the VSWR. The outer conductor of the component comprises a small diameter section 13 formed with a flange 14 and a large diameter section 15 formed with a flange 16. The two sections are held together by screws such as 17 lodged in mating threaded recesses in the large diameter section 15.

The inner conductor of the component comprises a small diameter section 21 which may be soldered to the central rod 22 after the latter is inserted through the central opening in the annular insulating and supporting spacer 23. The large diameter section 24 is connected to rod 22 by a slightly larger diameter rod 25 and is formed with a beveled section 26. Large diameter section 24 is formed with a hollow recess 27 for accommodating the end of the large diameter transmission line inner conductor. The end of that large diameter transmission line inner conductor may be temrinated in a resilient bullet for snugly engaging the inside surface of recess 27.

The inside surface of the end wall of outer conductor 15 is formed with a beveled edge 31.

Figure 2:
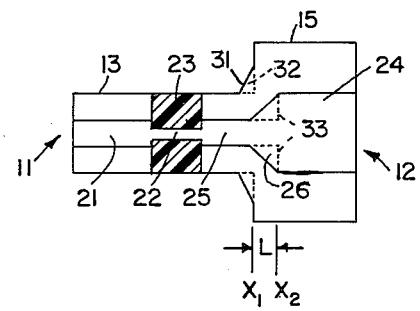
FIG. 2 is a diagrammatic longitudinal sectional view like FIG. 1 to illustrate more clearly the preferred location of the bevelled edges.

With reference now to FIG. 2, there is a diagrammatic representation of a sectional view through the invention showing the inner conductor, the inside surface of the outer conductor and the annular insulating support 23. Broken lines indicate where steps in a conventional narrow band step reducer might be located. As stated above it is desired to maintain substantially the same characteristic impedance. To this end the ratio of the inside diameter of outer conductor 13 to the outside diameter of inner conductors 21 and 25 is the same as the ratio of the diameter of the inside surface of outer conductor 15 to the outer diameter of inner conductor 24. Since the presence of insulating material 23 between inner conductor 22 and outer conductor 13 increases the effective capacitance per unit length of that section, the diameter of rod 22 is reduced so that the characteristic impedance of this section is substantially the same as that of the adjacent sections.

A conventional step reducer might typically have a step in the plane of the line located at $X_1$ with a sharp corner 32 defined by the broken lines. The inner conductor of a typical step reducer might have a step in the plane $X_2$ as indicated by the broken lines 33.

Figure 3:
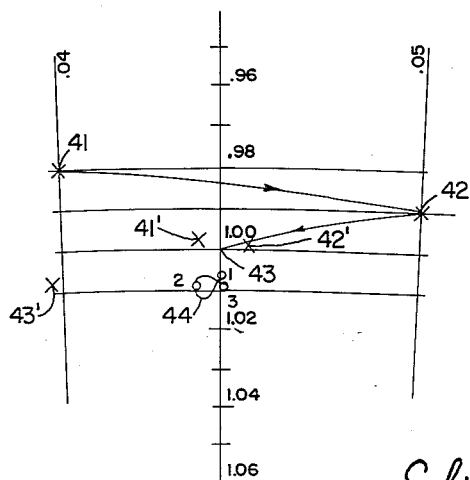
FIG. 3 is a greatly enlarged central portion of a Smith Chart impedance plot helpful in understanding the improvement afforded by the invention.

Referring to FIG. 3, there is shown a magnified central portion of a high resolution Smith Chart helpful in appreciating the new and unexpected results obtained with a structure according to the invention and in describing phenomena discovered in connection with making this invention. It is first helpful to describe observations made in connection with a typical step reducer having the sharp corners represented by the broken lines 32 and 33. The effect of such a sharp step is to introduce an effective capacitance in the plane $X_1$ of the coaxial system represented by the point 41 in FIG. 3 having a real normalized component of 0.98 and a negative normalized reactive component of 0.04 in the plane $X_1$. If the impedance in the plane $X_1$ is referred to the plane $X_2$ where the step 33 in the inner conductor 24 is represented, it may be represented by the point 42 having a normalized resistive component of 0.99 and an inductive reactive component of 0.05. If the distance between steps 32 and 33 are separated by an appropriate distance L, for a particular frequency of interest, the capacity introduced by the step 33 in the plane $X_2$ will exactly cancel the inductive component introduced in that plane due to the presence of step 32 so that the resultant normalized impedance presented in the plane $X_2$ at point 43 is substantially unity. The shortcoming of this type of compensation is that it is effective over a relatively narrow range of frequencies.

It was discovered that if the corner 32 was beveled off, there was a considerable reduction in the reactive component introduced so that the impedance in plane $X_1$ could be represented by the point 41'. The impedance of such a beveled inside surface in the plane $X_2$ would then be represented by the point 42', but measurements showed that beveling the step 32 alone actually produced worse results than the original pair of steps. It was discovered that the reason for this was apparently caused by the relatively high capacity introduced by the step 33 combining with the relatively small inductive reactive component then introduced into plane $X_2$ by the beveled inside surface of the outer conductor. This combination seemed to have a resultant impedance predominantly capacitive represented by the point 43' having a normalized resistive component of the order of 1.01 and a normalized reactive component of the order of −0.04. It was, however, discovered that by filling in the corner 33 with the beveled portion 26 of inner conductor 24, the normalized capacitive reactive component effectively introduced in plane $X_2$ by the beveled section 31 was so small that the resultant effective normalized impedance in plane $X_2$ was essentially unity, represented by point 43. Moreover, this result was found to occur over an exceptionally wide range of frequencies from essentially D.-C. to beyond 3,000 megacycles.

The impedance curve 44 shows the variation in impedance referred to the plane $X_2$ of an actual embodiment according to the invention with the circled points identified by the numerals 1, 2 and 3 corresponding to normalized impedance at 1,000, 2,000 and 3,000 megacycles, respectively. The measured deviation is due to reflections introduced by the source generator.

In that exemplary embodiment, the diameter of rod 22 was 94 mils, the diameter of inner conductor sections 21 and 25 was 120 mils, the length of rod 22 was 312 mils and that of insulating spacer 23, 311 mils. Insulating spacer 23 was made of Teflon and its inside and outside diameters were 93.7 and 317 mils, respectively. The length of rod 25 was 222 mils. The length of large diameter inner conductor 24 was 655 mils and its diameter, 435 mils. The angle of beveled section 31 with the axis was 45°. The inside diameter of small outer conductor 13 was 276 mils. The maximum inside diameter of beveled edge 31 was 625 mils and it made an angle of 60° with the axis of the assembly. The right end of beveled edge 31 overlapped the left edge of beveled edge 26 for an axial distance of 16 mils. The inside diameter of large outer conductor 15 was 1 inch. The overall length of the compensated reducer with the type N jack on the end as shown was but 2¼ inches as compared to a length of more than 5 inches for a comparable tapered reducer. And the cost is reduced by a factor greater than 4.

It is believed desirable to maintain the axial separation of beveled edges 26 and 31 small compared to a wavelength at the highest frequency of energy to be transmitted by the component. Yet, it is believed desirable to maintain these beveled edges axially displaced so that they can coact in the manner described. Thus, it was, in the exemplary embodiment, desirable to have beveled edge 31 partially overlap beveled edge 31.

It is evident that those skilled in the art may now make numerous modifications of and departures from the specific embodiment described herein without departing from the inventive concepts. Consequently, the invention is to be construed as limited only by the spirit and scope of the appended claims.

What is claimed is:

1. High frequency apparatus for intercoupling a coaxial transmission line of a first diameter with a coaxial transmission line of a second diameter comprising, a first coaxial section having an inner conductor and an outer conductor, a second coaxial section having an inner conductor with a diameter greater than that of said first section inner conductor and an outer conductor with a diameter greater than said first section outer conductor, an outer conductor with a beveled inside surface interconnecting said first section and said second section outer conductors and coaxially surrounding a part of said first section inner conductor but axially displaced from said second section inner conductor, and a beveled inner conductor interconnecting said first section and said second section inner conductors and coaxially surrounded by a part of said second section outer conductor but axially displaced from said first section inner conductor, said beveled outer conductor partially coaxially surrounding said beveled inner conductor, said beveled edges introducing reactive impedances of substantially equal magnitude and opposite sense in a plane of said first and second sections over the frequency range below a prescribed microwave frequency having a wavelength long compared to the axial displacement between said beveled inner conductor and said beveled outer conductor.

2. High frequency apparatus in accordance with claim 1 wherein said first and second sections are dimensioned to have substantially the same characteristic impedance.

3. High frequency apparatus in accordance with claim 2 wherein said beveled outer conductor and said beveled inner conductor form an angle of substantially 60° and 45°, respectively, with the axis of said sections.

4. High frequency apparatus for intercoupling a coaxial transmission line of a first diameter with a coaxial transmission line of a second diameter comprising, a first coaxial section having an inner conductor and an outer conductor, a second coaxial section having an inner conductor and an outer conductor, each of different diameters from that of the inner and outer conductors respectively of said first section, an outer conductor with a beveled inside surface interconnecting said first and said second section outer conductors, and an inner conductor with a beveled outside surface interconnecting said first and said second section inner conductors, said beveled surfaces coaxial about the axis of said sections but axially displaced by a distance small compared to a wavelength at a predetermined microwave frequency and dimensioned to introduce effective substantially equal reactances of opposite sense in a plane of said sections below said microwave frequency.

References Cited in the file of this patent
UNITED STATES PATENTS

| | | |
|---|---|---|
| 2,127,408 | Kaar | Aug. 16, 1938 |
| 2,438,912 | Hansen | Apr. 6, 1948 |
| 2,464,277 | Webber | Mar. 15, 1949 |
| 2,498,335 | Hunt | Feb. 21, 1950 |
| 2,540,012 | Salati | Jan. 30, 1951 |